M. B. Atkinson,
Potato Peeler.
No. 107,321. Patented Sep. 13, 1870.
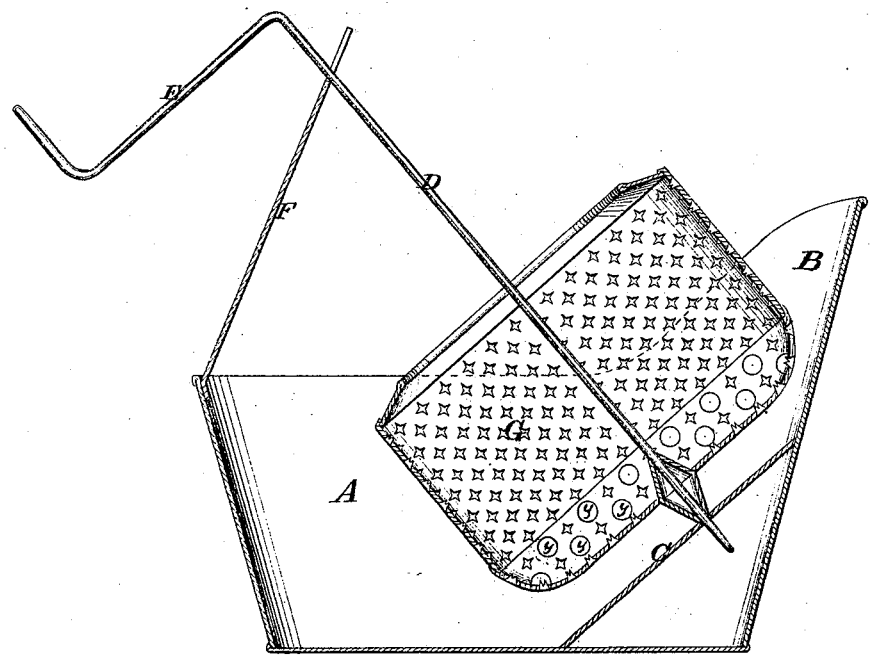
Witnesses.
C. Kenyon.
Geo. P. Mau.
Inventor,
M. B. Atkinson,
Chipman Hosmer & Co,
Attorneys

United States Patent Office.

MAHLON B. ATKINSON, OF GEORGETOWN, DISTRICT OF COLUMBIA, ASSIGNOR TO HIMSELF AND JAMES H. WELCH, OF SAME PLACE.

Letters Patent No. 107,321, dated September 13, 1870.

IMPROVEMENT IN POTATO AND FRUIT PEELERS.

The Schedule referred to in these Letters Patent and making part of the same

*To all whom it may concern:*

Be it known that I, MAHLON B. ATKINSON, of Georgetown, in the county of Washington and District of Columbia, have invented a new and valuable Improvement in Potato and Fruit Peelers; and I do hereby declare that the following is a full, clear, and exact description of the construction and operation of the same, reference being had to the annexed drawing making a part of this specification, and to the letters and figures of reference marked thereon.

Figure 1 of the drawing is a central vertical section of my invention.

My invention relates to means for washing and peeling vegetables and fruit, and consists in the novel construction and arrangement of a rotating perforated vessel, adjusted in a diagonal position within a water-holding receptacle, as hereinafter particularly described.

A of the drawing represents a large dish or receptacle, usually constructed with an enlarged open top, and with a projection, marked B, which projection serves as a dash-board or guard to prevent the water from being thrown over the rim of the dish.

C represents a brace, arranged diagonally from one side to the bottom of the water-receptacle, to form a suitable bearing for the bottom of the rotating shaft described hereafter.

D represents the operating rotating shaft of my device, the upper end of which is bent to form the crank E, while its lower end is adapted to fit and rotate in a suitable aperture in the brace C, as shown.

F represents a brace, affixed to the side of the water-receptacle, and extends upward, as shown, to form a rest and bearing for the shaft D.

G represents a perforated vessel firmly attached to the shaft D, and which consequently rotates therewith. This vessel G is perforated from the outside, and usually by means of a sharp-pointed triangular or quadrangular-shaped instrument, the object being to form a series of sharp points or knives resembling a grater, to scrape the skin from the fruit or vegetables that may be placed in the vessel.

The letters $y$ represent a series of openings through the bottom of the holder G, and are intended to provide for a free passage of water both into and out of the holder G. The skins of the fruit or vegetables also pass out of the rotating holder through these large apertures.

I find it desirable to round the corners of this vessel G, as the drawing represents.

I am aware that vessels have been invented for the purpose of peeling and washing vegetables and fruit by means of water and grater-teeth; but, so far as I have knowledge, all such devices have been arranged in upright or horizontal positions, thereby losing much of the efficiency secured by my apparatus.

I do not claim broadly the invention of rotating perforated vessels moving in water; but

What I claim as my invention, and desire to secure by Letters Patent, is—

The rotating perforated scraper and holder G, having its axis oblique to the perpendicular, substantially as specified.

In testimony that I claim the above I have hereunto subscribed my name in the presence of two witnesses.

M. B. ATKINSON.

Witnesses:
  E. W. ANDERSON,
  EDM. F. BROWN.